(12) United States Patent
Wicker

(10) Patent No.: US 9,354,071 B2
(45) Date of Patent: May 31, 2016

(54) DYNAMICALLY DETERMINING MEETING LOCATIONS

(71) Applicant: International Business Machines Corporation, Armonk, NY (US)

(72) Inventor: Jason M. Wicker, Pittsboro, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/496,772

(22) Filed: Sep. 25, 2014

(65) Prior Publication Data
US 2016/0091330 A1    Mar. 31, 2016

(51) Int. Cl.
*G01C 21/00*    (2006.01)
*G01C 21/34*    (2006.01)
*H04L 29/06*    (2006.01)
*H04L 29/08*    (2006.01)

(52) U.S. Cl.
CPC ............ *G01C 21/3438* (2013.01); *H04L 67/10* (2013.01); *H04L 67/18* (2013.01); *H04L 67/42* (2013.01)

(58) Field of Classification Search
CPC ......... H04L 67/10; H04L 67/18; H04L 67/42; G01C 21/3438
See application file for complete search history.

(56) References Cited

U.S. PATENT DOCUMENTS

| 4,791,572 | A * | 12/1988 | Green, III | ............. G01S 5/0009 340/990 |
| 8,600,670 | B2 | 12/2013 | Kim | |
| 9,049,238 | B2 * | 6/2015 | Scuba | ...................... H04L 67/18 |
| 2003/0095722 | A1 * | 5/2003 | Regimbal | ............... B41J 11/008 382/296 |
| 2005/0202834 | A1 * | 9/2005 | Sudit | ..................... H04W 4/023 455/456.5 |
| 2005/0243165 | A1 * | 11/2005 | Endler | ................ G06Q 10/109 348/14.02 |
| 2006/0227047 | A1 * | 10/2006 | Rosenberg | ............ G01S 5/0054 342/357.55 |
| 2007/0249327 | A1 * | 10/2007 | Nurmi | ..................... G06Q 10/10 455/414.1 |
| 2008/0094278 | A1 * | 4/2008 | Castaneda | ............. G01S 5/0045 342/357.64 |
| 2008/0140650 | A1 * | 6/2008 | Stackpole | ........... G06F 17/3087 |
| 2009/0100037 | A1 * | 4/2009 | Scheibe | .............. G06F 17/3087 |
| 2010/0076951 | A1 * | 3/2010 | Lyle | ........................ G06Q 10/10 707/706 |
| 2010/0274855 | A1 * | 10/2010 | Wassingbo | ........... G06Q 10/109 709/206 |
| 2011/0113148 | A1 * | 5/2011 | Salmela | ............. G01C 21/3438 709/229 |
| 2012/0271883 | A1 * | 10/2012 | Montoya | ............... H04W 4/023 709/204 |
| 2012/0289206 | A1 | 11/2012 | Shim | |
| 2013/0080204 | A1 * | 3/2013 | Khorashadi | .......... G06Q 10/109 705/7.19 |

FOREIGN PATENT DOCUMENTS

GB    2461685 A  *  1/2010  .............. H04W 4/02

OTHER PUBLICATIONS

Mezzoman, "Mezzoman—V3—Meet in the Middle!," Mezzoman.com, 2007, retrieved Sep. 25, 2014, 2 pages.

(Continued)

*Primary Examiner* — Calvin Cheung
(74) *Attorney, Agent, or Firm* — Jordan IP Law, LLC

(57) ABSTRACT

Systems and methods may provide turn-by-turn directions to a group of users who wish to meet one another. The systems and methods make use of a client application running on client-side devices such as smart phones in conjunction with a server-side application running on a server. The identity of the final meeting place may not be determined until the users are in close proximity to it, as its location is subject to continuous updating using the geo-coordinates of the users as they travel. Additionally, the meeting place may be determined in part by the users' individual preferences. These preferences, along with the locations of the users, may be kept hidden from other users.

9 Claims, 6 Drawing Sheets

(56) References Cited

OTHER PUBLICATIONS

Meetways, "MeetWays—Meet in the Middle—Find a point of interest between two addresses," Meetways.com, 2014, retreived Sep. 25, 2014, 1 page.

Geomidpoint, "Let's Meet in the Middle—GeoMidpoint," Geomidpoint.com/meet/, 2007, retrieved Sep. 25, 2014, 2 pages.
List of IBM Patents or Patent Applications Treated as Related, May 30, 2015, 1 page.

* cited by examiner

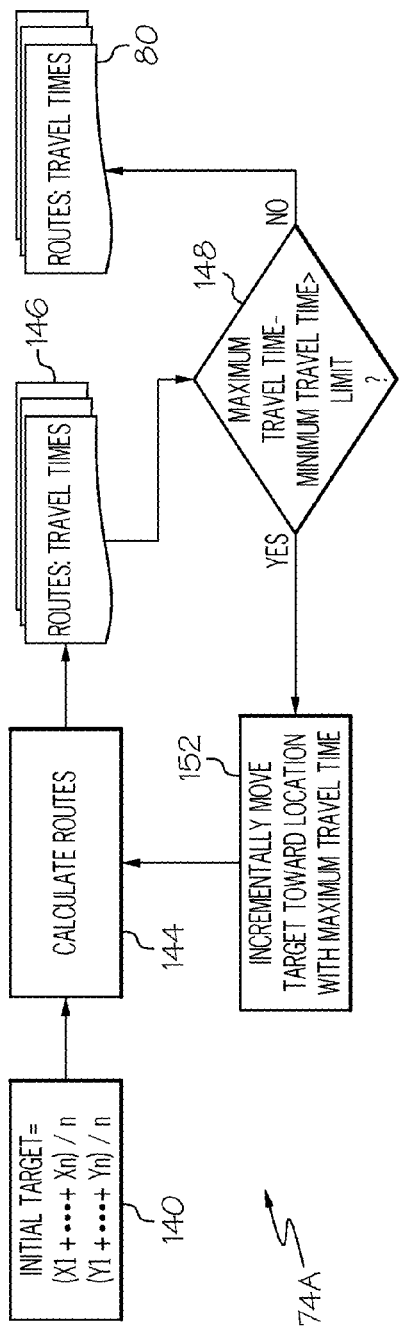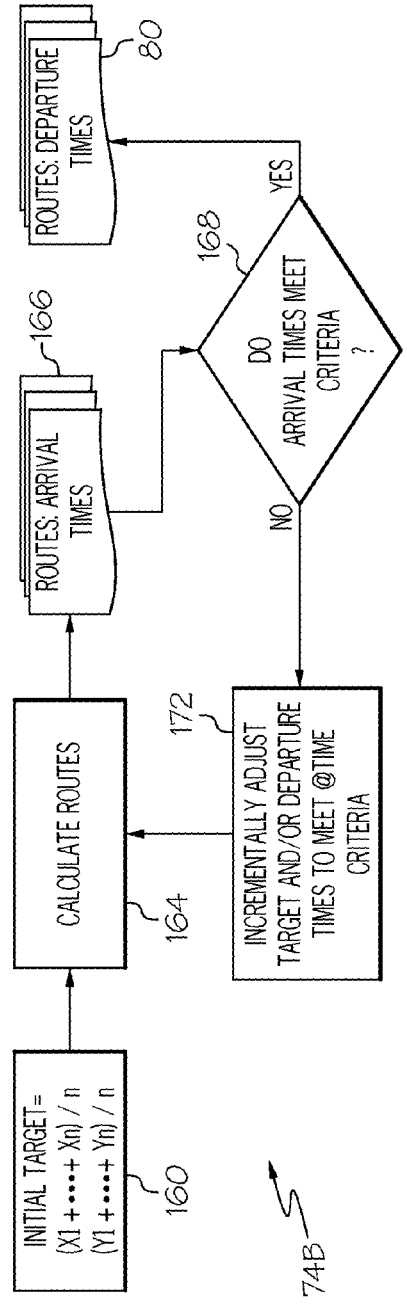

DYNAMICALLY DETERMINING MEETING LOCATIONS

BACKGROUND

Embodiments of the present invention generally relate to navigation applications that facilitate meetings among a plurality of individuals and more particularly to applications that provide their users with turn-by-turn directions to a meeting place.

Smart phones may be used to perform a variety of tasks in the social networking space, including helping to facilitate face-to-face meetings among individuals. However, the task of determining where and when to meet may be challenging in terms of time commitments, geographic constraints, and in dealing with the often protracted negotiations among the users with respect to selecting a meeting place. Depending on the context of the meeting, the process may also present issues with respect to privacy, especially in situations where not every one of the individuals knows the others well.

BRIEF SUMMARY

Embodiments may include a computer program product to facilitate meetings among users of client devices, the computer program product comprising a computer readable storage medium having program instructions embodied therewith. The program instructions are executable by a processor on a computer to cause the computer to detect a meeting request at a server, the meeting request coming from at least one user of a client device, detect at the server an acceptance of the meeting request from at least one user of a client device, receive at the server identifying information from said client devices, receive at the server geo-location coordinates from said client devices, compute a map centroid of said geo-location coordinates of said client devices, select a meeting place within a defined distance from the map centroid, provide turn-by-turn directions to the client devices to said meeting place, and periodically receive updated geo-location coordinates of the client devices and using this information to recalculate the map centroid of the geo-location coordinates of said client devices and said meeting place.

Embodiments may also include a method of automatically facilitating a meeting, comprising detecting a meeting request at a server, the meeting request coming from a first set of client devices, detecting at the server an acceptance of the meeting request from a second set of client devices, receiving at the server identifying information from the first and second sets of client devices, receiving at the server geo-location coordinates from the first and second sets of client devices, computing a map centroid of said geo-location coordinates, selecting a meeting place within a defined distance from the map centroid, providing turn-by-turn directions to the first and second sets of client devices to said meeting place, and receiving updated geo-location coordinates of the client devices and using this information to update the map centroid and meeting place.

Embodiments may also include a computer program product to facilitate meetings among users of client devices, the computer program product comprising a computer readable storage medium having program instructions embodied therewith, the program instructions executable by a processor on a computer to cause the computer to detect a meeting request at a server, the meeting request coming from a first set of client devices, detect at the server an acceptance of the meeting request from a second set of client devices, receive at the server identifying information from the first and second sets of client devices, receive at the server geo-location coordinates from the first and second sets of client devices, compute a map centroid of said geo-location coordinates, select a meeting place within a defined distance from the map centroid, provide turn-by-turn directions to the first and second sets of client devices to said meeting place, and periodically receive updated geo-location coordinates of the first and second sets of client devices and using this information to update the map centroid and meeting place.

Additional embodiments may include a computer product that is operable as a server-side application.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 3 is a flowchart of an example of a method of generating large-map instructions using a first set of parameters according to an embodiment;

FIG. 4 is a flowchart of an example of a method of generating large-map instructions using a second set of parameters according to an embodiment;

DETAILED DESCRIPTION

Figure 1:
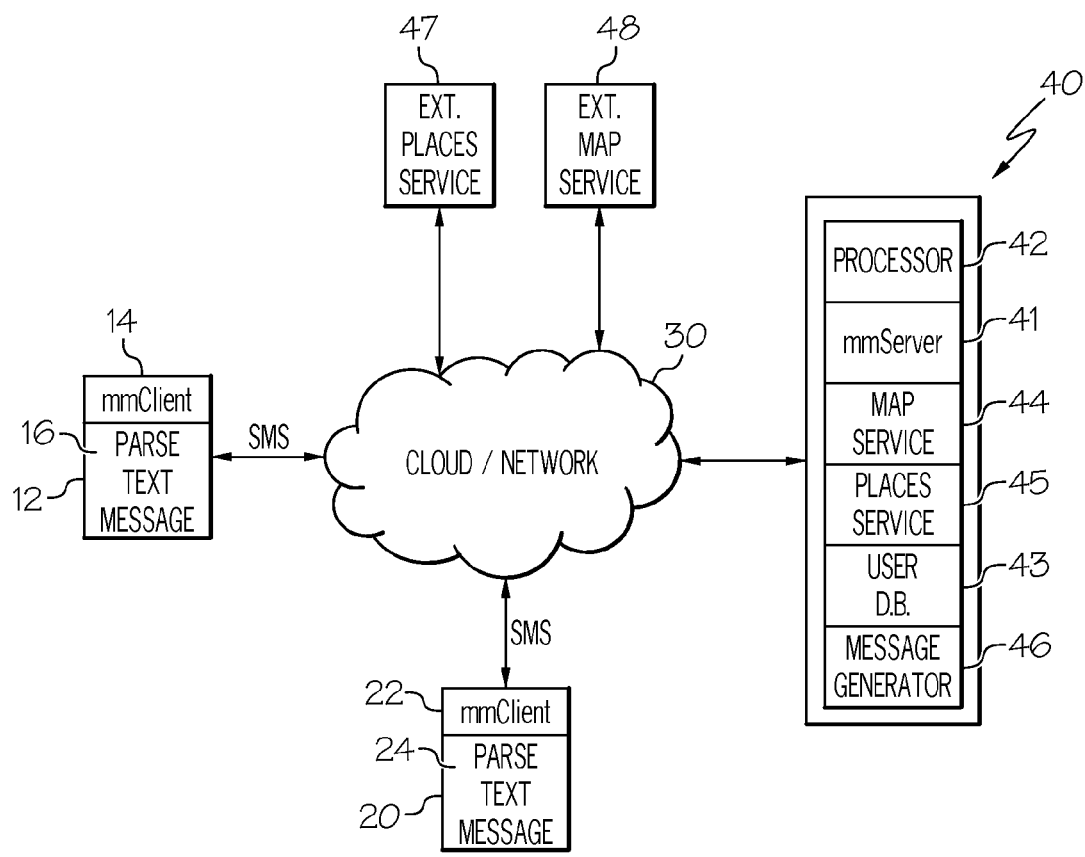
FIG. 1 is a block diagram of an example of a system to automatically generate turn-by-turn navigation instructions according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

So-called "smart phones," as well as communications-capable notebook computers, computer tablets, and other processor-based electronic devices may be used to arrange meetings among their users. At a simple level, one person may sequentially telephone several others and propose meeting at a time and place, but such manual attempts at arranging a meeting may be expensive in terms of time and effort, and entail considerable negotiating among the would-be participants as they seek a common ground suitable to all at a time that is convenient.

The present embodiments disclose more efficient ways of enabling meetings among a plurality of participants, each being the user of a client-side application that is in communication with a server that runs a server-side application. The embodiments may reduce the effort required to arrange a meeting by leveraging technology in seeking a "common ground" in terms of general location, meeting venue, and time. In one embodiment, the users text one another individually or in groups, invoking an application which, for the sake of brevity here is called "meetme". The application runs on the users' smart phones, tablets or other geo-locatable devices, and communicates with a corresponding server-side application resident on a cloud-based or other remote server. The server-side application provides various degrees of assistance in setting up a meeting time and place according to the preferences of the participants and their geo-coordinates, as well as various local conditions (weather, traffic conditions, venue details and so forth). Depending on the embodiment employed, the server-side application regularly and continuously monitors the location of the participants by accessing the Global Positioning System (GPS) coordinates provided by each user's client-side device, calculating and recalculating plausible target destinations for their meeting and forwarding turn-by-turn directions to each user. Should local circumstances delay the calculated arrival of a participant, the server sends updated directional information that may reflect a new and dynamically updated route to the final destination or, indeed, change that final destination. These and other features will become clearer as the embodiments are discussed in the context of the drawings.

A system according to an embodiment is presented in FIG. 1. Users interested in meeting other users are provided with GPS-capable client-side user devices 12 and 20, which may be smart phones, tablet computers, wearable computers or other types of mobile client devices. The illustrated system is scalable, in that while just two such devices are shown in FIG. 1, greater numbers n of such devices may be used. Each of the illustrated user devices 12 and 20 runs a client-side application (labeled "mmClient" in the figure at 14 and 22), and is capable of text messaging via a cloud 30, which may be a wide area network, local area network, Third Generation (3G) network, Fourth Generation (4G) network, intranet, or the internet. The illustrated user devices 12 and 20 are further capable of parsing the text messages at 16 and 24 to detect the use of key words or phrases (e.g., "#meetme," where the hashtag is reflective of common usage) by which the client application mmClient may be invoked.

In the illustrated embodiment, a server 40, which is accessible via cloud 30, runs a server-side application 41, here labeled "mmServer," that works with the client-side applications 14 and 22 as is further explained below. The server 40 may further include a processor 42, a database of user preferences 43, an internal map service 44, an internal places service 45 and a text message generator 46. In other embodiments, instead of or in addition to the internal map service 44 and the internal places service 45, the server may access an external place service 47 and an external map service 48 via a network, including the cloud 30. Similarly, the server 40 may utilize other databases external to it to access user preference and other information. Examples of commercially available map services that may be of use in some embodiments include Google Maps® and MapQuest®. Examples of commercially available place services include Yelp® and Google+Local®. Such services may typically provide listings of businesses, including such additional information as hours of operation, menus (if restaurants), consumer reviews, etc.

Figure 2:
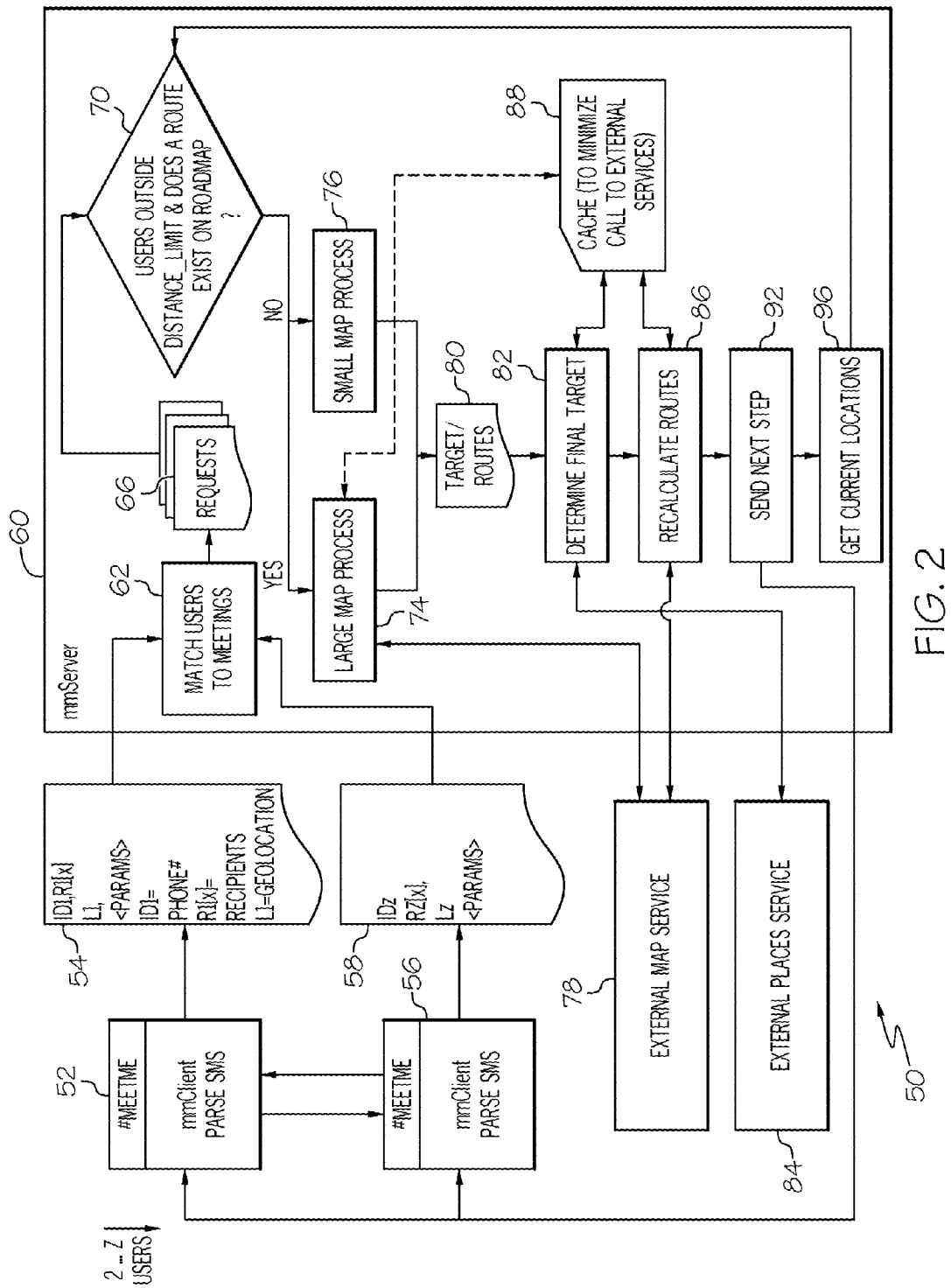
FIG. 2 is a flowchart of an example of a method of automatically generating turn-by-turn navigation instructions according to an embodiment.

Turning now to FIG. 2, one example of a method 50 according to an embodiment is shown. At block 52, a user texts #meetme (or may text another content-specific phrase relevant to meeting) to another user via a smart phone, which invokes a client-side application here indicated as "mmClient," and sends a text message to another user who has a similarly equipped client device indicated at block 56, requesting a meeting. A text parser to identify keywords in a text message may be employed to automatically start the mmClient application. The application may be resident on the user side on a GPS-capable smart phone. Alternatively, in other embodiments the user may choose to launch the application manually. The recipient of the invitation may choose to accept or decline the invitation.

When meeting invitations are made or accepted, the client-side application mmClient may initiate requests for certain information at blocks 54 and 58 that may be stored locally on each user's smart phone or other client-side device. The requested information may include the particular sending user's $ID_n$, which initially is the identity (e.g., phone number) of the person sending that request (equivalent to the "From:" field in an email). The information also may include the identities of the recipients of the text message, grouped into an array or matrix of size x, Rn[x], geo-location coordinates L for each of the users (these may be GPS coordinates), and various other locally stored parameters indicating user preferences. The preferences may include preferred destinations, social media rankings of possible destinations, the maximum distance a user is willing to travel, the maximum travel time that a user is willing to incur, dietary considerations, social dislikes (e.g., a request to be left out if someone the user does not wish to see has also been invited), requested arrival times (a user may not be able to stay out late), and so forth. Blocks 54 and 58 may forward user-specific information via a network (e.g., the cloud 30 shown in FIG. 1) to the server 60, on which runs the server-side application here labeled "mmServer."

The identities of all users who have accepted the invitations may be matched to the identity of the user who sent the invitations in block 62, so that the users are correctly grouped to the correct meeting (should there be several different meetings in play at a given time). Other information concerning preferences may be stored in block 62. Apart from the phone numbers by which the initiating user or users have texted invitations to others to meet, the information may be kept hidden from the users, thereby providing a measure of privacy protection to the participants. Thus, in some embodiments the starting locations of the users and their meeting preferences, while available to the application at the server level, are not made available to the other users. In other embodiments, permissions may be set to enable some or all of the participants to further know the location of the others as well as other user preference information.

The illustrated embodiment handles the task of providing turn-by-turn directions to meetings when all of the users are in sufficiently close proximity to one another differently than when they are not. Examples of the former case include situations where all of the users are at a shopping mall, inside a town's public park, an arena, or a stadium. In such places, further movement will typically be accomplished on foot a short ways and not along a street grid or via a road map. This situation is handled differently from meetings where the participants are traveling by road some greater distances.

These two scenarios are tested for in block 70. Using some predetermined distance limit (which may be measured in hundreds of meters, in the case of a shopping mall), it is first determined if all of the users are within a distance limit of one another. In other embodiments, the test may be if some lesser fraction of the users are inside the distance limit of one another. If at least one user is more than this distance from any other user, then the illustrated method takes into account certain aspects of travel, such as the provision of road map sensitive turn-by-turn instructions, that it does not when the users are either all within the distance limit of one another or when there is no map available to consider. For example, users may already be in a cognizable venue such as a stadium or a shopping mall that, while possibly large, entails a small-map process in which travel time is not a concern, as the participants are already more or less within range of one another and not on the road. As is further explained below, the scenario may require some analysis of any obstacles that might prevent the users from simply walking towards one another. On the other hand, if the users are more than a distance limit from one another, they may need to drive or otherwise travel over a large-area map and make use of turn directions keyed to road map (assuming such a map is available).

Considering now specific examples, a determination may be made at 70 that at least one of the users is more than a distance limit away from at least one other user. If it is then also true that there is a road map on which a route for the user can be generated, the illustrated server 60 invokes the large map process 74 (two embodiments of which, 74A and 74B, are further depicted in FIGS. 3 and 4). Otherwise, the small map process 76 is invoked.

In the first illustrated embodiment of a large map process 74A in FIG. 3, block 140 may use the GPS coordinates of the users in conjunction with an external map service 78 (see FIG. 2) to compute a map centroid based on the coordinates of the locations fed to it of each of the n users who have indicated that they wish to meet. The server has access to the locations of each such user, and may use the external map service 78 (or an internal map service) to determine the coordinates x and y of each user and plot them on a map in Cartesian terms. Block 140 may take this data and compute an average value for the (x,y) coordinates of the n users, which constitutes a user map centroid $(\overline{X}, \overline{Y})$, where:

$$\overline{X} = (X_1 + X_2 + \ldots + X_n)/n \qquad \text{(eqn. 1)}$$

$$\overline{Y} = (Y_1 + Y_2 + \ldots + Y_n)/n \qquad \text{(eqn. 2)}$$

The map centroid may be provisional, and may be plotted as a "target" location on a map. As is explained further below, it is subject to modification. The centroid coordinates are used in illustrated block 144 to calculate routes from the last known location of the users to the map centroid, and a set of routes and estimated travel times is generated at illustrated block 146. At block 148 it may be determined whether the maximum travel time for any one user exceeds the minimum user travel time for any other user by some limit. If so, then at block 152 the target coordinates (which initially correspond to the centroid coordinates) may be incrementally moved towards the location of the user with that maximum travel time, thereby shortening the user's distance to the newly recalculated target location. Control passes back to illustrated block 144 where routes are again calculated. The travel times are again tested at 148 and if the limit is not exceeded, control passes to block 80 in FIG. 2.

The embodiment of a large map process 74B shown in FIG. 4 considers another set of constraints that may be imposed in addition to or in place of the travel time constraints addressed in FIG. 3, namely, preferences relating to the users' arrival times. The users may wish to arrive at the same time, which may entail variations either in their individual departure times or in their destination. In illustrated block 160, the map centroid is calculated as before, and routes from the users to the centroid may be computed in block 164 from the last known location of the users. At illustrated block 166 a set of routes and estimated arrival times is generated. It may be that users have indicated a preference for arriving at the same time, or even at a particular time as well. Block 168 may determine if the routes meet these time constraints and if they do, control is passed to block 80 in FIG. 2. If the routes do not, then the departure times and/or the target location are adjusted towards the user whose time constraints have not been met, and the routes are recalculated, along with departure times for each user to get them to their destination as requested. This process may be repeated until all of the user time constraints have been satisfied. Moreover, the illustrated process may be adapted to deal with other constraints as well, such as limitations on travel distance. In other embodiments, these and the large map processes of FIGS. 3 and 4 may be chained together, so that the embodiment of the method takes into account multiple constraints, including distance and time considerations.

Figure 5:
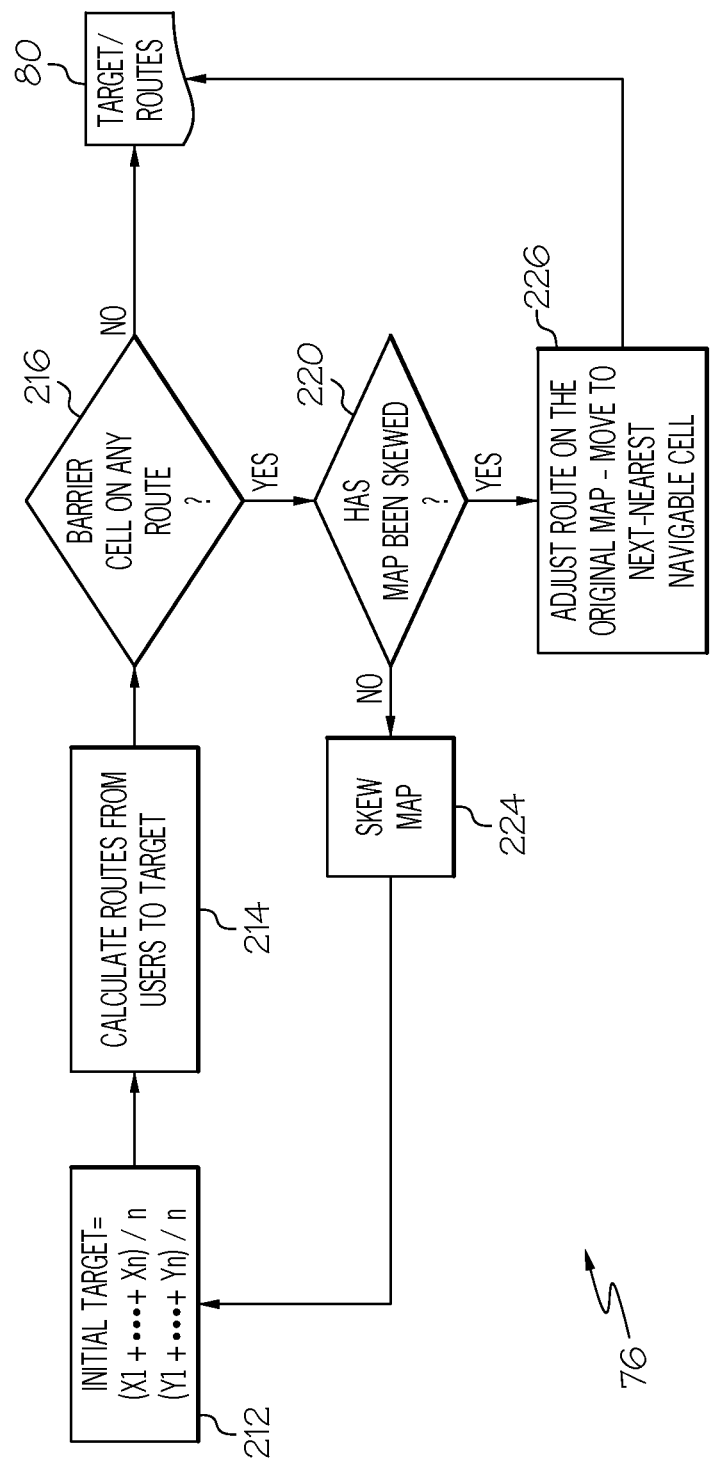
FIG. 5 is a flowchart of an example of a method of generating small-map instructions according to an embodiment.

FIG. 5 illustrates an example of a small map process 76, an embodiment of use in situations in which all of the users are at a location that is within some predetermined distance of one another. At this stage, it may be that the users are in some location such as a shopping mall, arena, park or a stadium where the distances at hand may not entail use of additional road directions, and the users may, in principal, walk some distance towards a specific meeting place. While additional travel time and distance may not be of principal concern here, other local conditions may be. It may be that the targeted meeting location is not a practical meeting spot at the more local scale addressed here. For example, it is possible that the target lies at the center of a stadium that is not accessible to the users. Or even if the target is in an accessible spot, it may be that a portion of a route to it passes through an inaccessible spot. The illustrated small map process 76 addresses such situations.

In other situations where this embodiment may be used, the users may not be in close proximity to one another, but outdoors in a roadless wilderness area where there are numerous barriers to contend with.

Illustrated block 212 computes the centroid of the user locations in the manner previously indicated and provides the centroid as a provisional target on a map. At block 214 routes from the users to this target may be computed for each user. Conditional block 216 determines whether a barrier exists that could prevent the users from traveling to the target. If no such barrier exists, then the routing is forwarded to the main body of the flowchart at 80 in FIG. 2.

Figure 6A:
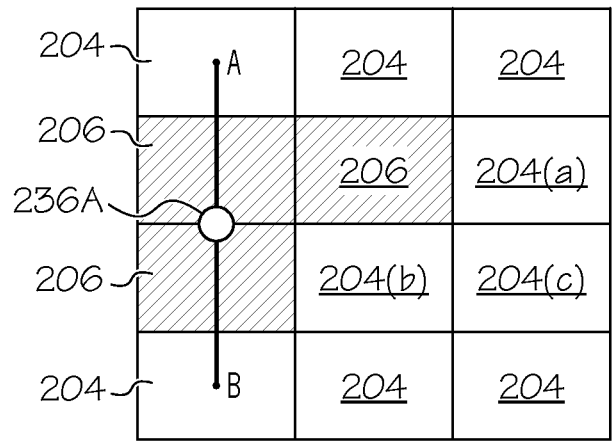
FIGS. 6A, 6B and 6C schematically illustrate an example of a method of generating small map instructions in the presence of an obstacle according to an embodiment.

However, the situation may be as is depicted in FIG. 6A, which shows a map as a grid of navigable cells 204 and inaccessible barrier cells 206. In FIG. 6A, users A and B are standing in navigable cells 204, but the target 236A where they are to meet is located in the midst of barrier cells 206.

Figure 6B:
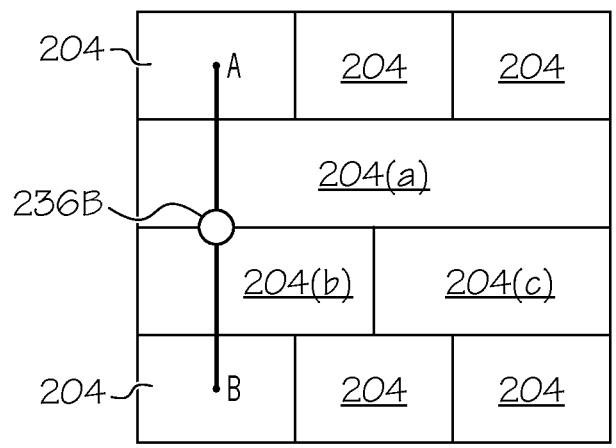
Figure 6C:
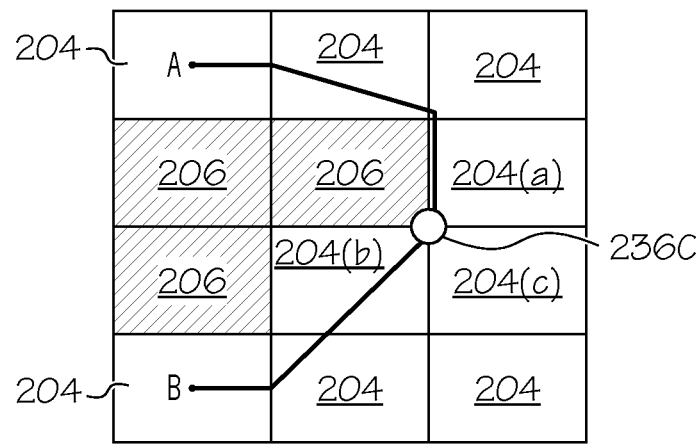

The embodiment employed here employs map skewing. As is illustrated in FIGS. 6A-6C, map skewing is a process in which barrier cells 206 are first removed and replaced with stretched versions of adjacent navigable cells 204a, b, and c while keeping the route and target in place, yielding the map shown in FIG. 6B having target 236B. The removed barrier cells are then reintroduced, in effect shoving the target and routing over to the right at 236C in FIG. 6C, now avoiding the barrier cells 206.

Returning to FIG. 5, should block 216 determine that there is a barrier (e.g., the barrier cells 206 in FIG. 6A), block 220 determines if the map has been skewed. If not, then at block 224 the map is skewed as discussed above and the target centroid is recalculated at 212. If the map has already been skewed, then at block 226 the route on the original map is adjusted to move the target and route to nearest navigable cells. The new route, now clear of the target, is passed along at block 80.

In other embodiments, other methods and strategies may be employed to deal with the problem of mapping around a barrier, including incrementally moving the target to a navigable cell reachable by each of the users without their having to cross over any barrier cells.

The determination of a target may be provisional, and the initial target may not end up as the final meeting place. The computation of the target, while based on mathematical concerns such as centroids and the like, may correspond to an open field or other place not favored by the users, even if it is in principle accessible. In the illustrated embodiment depicted in FIG. 2, the target is passed to block 82 where a target location taking user preferences is determined.

Figure 7:
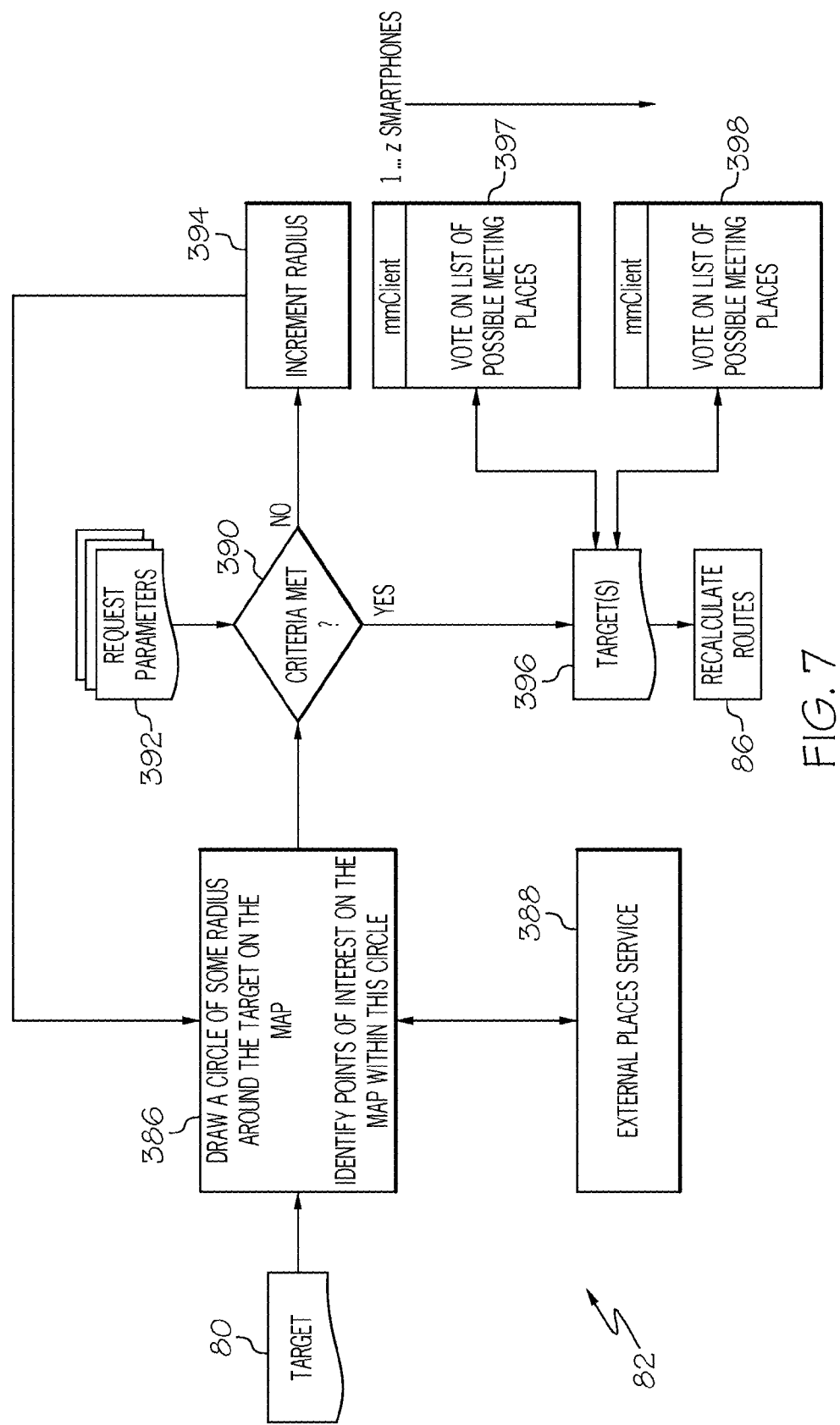
FIG. 7 is a flowchart of an example of a method of selecting a meeting location according to an embodiment.

Turning now to FIG. 7, an example of a method of determining a target according to an embodiment is shown. At block 386 the target previously calculated to up to this point is placed on a map. A circle having a predetermined radius (the size of the radius may be some default value or a value provided by users) is drawn about the point, and potential venues for meeting that lie within the circle are determined. For example, all or some businesses, public parks, venues that a map service or an external places service such as GOOGLE+ LOCAL locates within that circle may be referenced at block 388. These locations are winnowed down at conditional block 390 using the various criteria (e.g., user requests, preferences and parameters) stored at block 392, and specific locations and meeting venues that would be acceptable to all users are generated as a final target or target list at block 396.

The users may, in some embodiments, be given the opportunity to vote on the selections at blocks 397 and 398. In some embodiments, the voting process may be handled via text messaging. In other embodiments, identification of the meeting places may be withheld from the users and the application may instead choose one on their behalf. Such an approach may help speed the process of meeting by reducing further negotiating among the users over where to meet.

It may be that no suitable venue meeting all of the users' criteria falls within the radius tested against. In this case, control may pass from block 390 to block 394, where the radius is incremented some amount (either predetermined by the system or through user preference) and control loops back to block 386. The illustrated process thus repeats itself until at least one suitable target venue for meeting has been identified.

In order to minimize calls to external services, the server 60 may include a cache 88 to store various maps and map calculations.

Turning again to FIG. 2, after the target venue has been determined at block 82, at block 86 routes for each user to the selected target venue may again be computed (using, if need be, an external map service 78), and at illustrated block 92 directions in turn-by-turn form are provided, one turn at a time, to the users at blocks 52 and 56. It is noted that in the illustrated embodiment, only the "next step" or turn is provided, as may be characteristic of certain turn-by-turn navigation systems. In other embodiments more complete directions may be provided at once, along with a warning that these are subject to modification by the application.

At block 96, the current location of each user is updated and sent to conditional block 70. Thus, as the users approach one another, or as time elapses, the process of generating centroids and candidate target destinations iterates. Eventually, the users converge to within the distance limit tested for in block 70 with one another, and the small map process provides them with final guidance to their actual meeting place.

By iterating the process the embodiments accommodate changing circumstances such as traffic conditions, weather, slow travel on the part of a user, delays and so forth, so that the final location for meeting may be updated dynamically by the system without triggering the need for additional time consuming negotiations and discussions among the users. For example, if several people are traveling towards a given meeting place separately by car and one of them encounters heavy traffic, the embodiments permit a recalculation of the target destination, choosing a place that is closer to the delayed user. On a small map scale, such as in a shopping mall, one user may stop at a different venue on the way to the meeting place, and the other parties may be given updated directions to a new meeting location taking this into account. Thus, in these examples the meeting may occur sooner than it might if the selection of meeting place were static.

Embodiments may accommodate processing either single meeting requests or multiple meeting requests, and both the meeting requests and acceptances of meeting requests may be grouped in sets. In one embodiment, a meeting request may be generated by a first set of client devices, the set including one or more client devices. Each client device in the first set may be associated with one or more users of that device. Similarly, acceptance of a meeting request may come from a second set of client devices, the set including one or more client devices. Each client device in the second set may be associated with one or more users of that device.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A system to facilitate meetings among users of client devices, the system comprising a computer readable storage medium having program instructions embodied therewith, the program instructions executable by a processor on a computer to cause the computer to:
    detect a meeting request at a server, the meeting request coming from at least one user of a client device;
    detect at the server an acceptance of the meeting request from at least one user of a client device;
    receive at the server identifying information from the client devices;
    receive at the server geo-location coordinates from the client devices;
    employ map skewing to compute a map centroid of the geo-location coordinates of the client devices;
    select a meeting place within a defined distance from the map centroid;
    provide turn-by-turn directions to the client devices to the meeting place;
    periodically receive updated geo-location coordinates of the client devices; and
    recalculate the map centroid of the geo-location coordinates of the client devices and the meeting place based on the updated geo-location coordinates.

2. The system of claim 1, wherein the program instructions cause the computer to process user preference data to generate a list of possible meeting places within a predetermined distance of the map centroid.

3. The system of claim 2, wherein the user preference data is not available to be shared among the users.

4. The system of claim 2, wherein the user preference data relates to one or more of maximum travel time, maximum travel distance, departure time, arrival time, venue type preference, social preference, or dietary preference.

5. A system to facilitate meetings among users of client devices, the system comprising a computer readable storage medium having program instructions embodied therewith, the program instructions executable by a processor on a computer to cause the computer to:
    detect a meeting request at a server, the meeting request coming from a first set of client devices;
    detect at the server an acceptance of the meeting request from a second set of client devices;
    receive at the server identifying information from the first and second sets of client devices;

receive at the server geo-location coordinates from the first and second sets of client devices;

employ map skewing to compute a map centroid of the geo-location coordinates;

select a meeting place within a defined distance from the map centroid;

provide turn-by-turn directions to the first and second sets of client devices to the meeting place;

periodically receive updated geo-location coordinates of the first and second sets of client devices; and update the map centroid and meeting place based on the updated geo-location coordinates.

6. The system of claim 5, wherein the program instructions cause the computer to analyze preference data to generate a list of possible meeting places within a predetermined distance of the map centroid.

7. The system of claim 6, wherein the preference data is not available to be shared with another computer.

8. The system of claim 6, wherein the preference data relates to one or more of maximum travel time, maximum travel distance, departure time, arrival time, venue type preference, social preference, or dietary preference.

9. The system of claim 6, wherein if a preference cannot be accommodated for a given map centroid, the program instructions cause the map centroid to be incrementally displaced.

* * * * *